United States Patent
Hyun et al.

(10) Patent No.: US 8,090,420 B2
(45) Date of Patent: *Jan. 3, 2012

(54) BI-DIRECTIONAL SLIDING-TYPE PORTABLE TERMINAL

(75) Inventors: Sang-Min Hyun, Seoul (KR); Bum-Soo Park, Gwangmyeong-si (KR)

(73) Assignee: Samsung Electronics Co., Ltd (KR)

( * ) Notice: Subject to any disclaimer, the term of this patent is extended or adjusted under 35 U.S.C. 154(b) by 399 days.

This patent is subject to a terminal disclaimer.

(21) Appl. No.: 12/136,418

(22) Filed: Jun. 10, 2008

(65) Prior Publication Data

US 2008/0242381 A1   Oct. 2, 2008

Related U.S. Application Data

(63) Continuation of application No. 10/870,812, filed on Jun. 17, 2004, now Pat. No. 7,386,331.

(30) Foreign Application Priority Data

Jul. 16, 2003   (KR) .......................... 10-2003-48718

(51) Int. Cl.
*H04M 1/00* (2006.01)
*H04K 3/00* (2006.01)

(52) U.S. Cl. ............. 455/575.4; 455/556.1; 379/433.12

(58) Field of Classification Search ................. 455/90.3, 455/556.1–556.2, 575.1, 575.4; 379/433.11–433.12
See application file for complete search history.

(56) References Cited

U.S. PATENT DOCUMENTS

| 6,009,338 | A  | * | 12/1999 | Iwata et al. ................ 455/575.4 |
| 6,208,874 | B1 |   | 3/2001  | Rudisill et al. |
| 7,386,331 | B2 | * | 6/2008  | Hyun et al. ................ 455/575.4 |
| 7,792,557 | B2 | * | 9/2010  | Mizuta et al. ............. 455/575.4 |
| 2003/0036365 | A1 |   | 2/2003 | Kuroda |
| 2005/0124398 | A1 | * | 6/2005 | Lee et al. .................. 455/575.4 |

FOREIGN PATENT DOCUMENTS

| DE | 198 06 508 | 2/1998 |
| EP | 0 804 009 | 10/1997 |
| GB | 2 381 988 | 5/2003 |
| WO | WO 96/38762 | 12/1996 |

\* cited by examiner

*Primary Examiner* — Lee Nguyen
(74) *Attorney, Agent, or Firm* — The Farrell Law Firm, P.C.

(57) ABSTRACT

Disclosed is a bi-directional sliding-type portable terminal. The bi-directional sliding-type portable terminal comprises a phone body and a bi-directional sliding body. The phone body comprises a first section which is located on one side of the top surface thereof and within which a plurality of keys are mounted, and a second section which is located on the other side of the top surface thereof spaced apart from the first section and within which a camera lens housing is mounted. The bi-directional sliding body linearly moves on the phone body in a longitudinal direction while facing the phone body, opens the first section to expose the keys by moving toward the second section, and opens the second section to expose the camera lens housing by moving toward the first section.

8 Claims, 12 Drawing Sheets

BI-DIRECTIONAL SLIDING-TYPE PORTABLE TERMINAL

PRIORITY

This application is a continuation of application Ser. No. 10/870,812, filed Jun. 17, 2004, now U.S. Pat. No. 7,386,331 which claims priority to an application entitled "Bi-directional Sliding-type Portable Terminal" filed in the Korean Industrial Property Office on Jul. 16, 2003 and assigned Ser. No. 2003-48718, the contents of which are hereby incorporated by reference.

BACKGROUND OF THE INVENTION

1. Field of the Invention

The present invention generally relates to a portable terminal such as a cellular phone, a PDA (Personal Digital Assistant), an HHP (Hand Held Phone) or the like, and more particularly to a bidirectional sliding-type portable terminal capable of sliding in either direction.

2. Description of the Related Art

In general, a "portable communication device" means an electronic device which a user can carry with him/her to perform wireless communication with a desired partner. In consideration of portability, design of such a portable terminal has tended not only toward compactness, slimness and lightness, but also toward providing multimedia capabilities to allow the user to pursue more various functions. In particular, future portable terminals will be not only used for many functions and purposes despite compactness and lightness, but also be modified to be suitable for functioning in a multimedia environment and for providing internet access and functions. Additionally, such portable terminals may be used by men and women, young and old, anywhere in the world.

Conventional portable terminals may be classified into various types according to their appearance, such as bar-type portable terminals, flip-type portable terminals, and folder-type portable terminals. The bar-type portable terminal has a single housing shaped like a bar. The flip-type portable terminal has a flip which is pivotably mounted to a bar-shaped housing by a hinge unit. The folder-type portable terminal has a folder coupled to a single bar-shaped housing by a hinge unit in such a manner that the folder can be rotated in order to be folded to or unfolded from the housing.

Further, portable terminals may be classified as neck wearable type terminals and wrist wearable type terminals, according to the position at or the way in which a user puts on the terminal. The neck wearable type terminal is one which a user wears around the neck using a lanyard or string, while the wrist wearable type terminal is one which a user wears around the wrist.

Additionally, portable terminals may be classified as rotation-type terminals and sliding-type terminals according to ways of opening and closing the terminals. In the rotation-type portable terminal, two housings are coupled to each other in a manner that one housing rotates to be opened or closed relative to the other while facing each other. In the sliding-type portable terminal, two housings are coupled to each other in a manner that one housing slides to be opened or closed relative to the other. The various classifications of portable terminals are easily understood by those skilled in the art.

Further, each of the conventional portable terminals enumerated above has been converted so as to allow a voice communication as well as a high-speed data communication. That is, as consumer demands have increased, various services have been provided using wireless communication technology for transceiving data at a high speed.

It is a present tendency that a camera lens is mounted to the portable terminal, and that it is possible to transmit image signals and the like.

Meanwhile, present portable terminals are provided with an embedded or external camera lens module. Therefore, it is possible to perform image communication with a desired partner or to photograph a desired subject.

However, when the conventional portable terminals are provided with an external camera lens module, the risk is always taken of losing the camera lens module. Further, when the conventional portable terminals are provided with an embedded camera lens module, a lens of the camera lens module is always exposed to an external environment, allowing foreign materials to easily invade and deteriorate the lens, thus deteriorating the quality of photographed images.

SUMMARY OF THE INVENTION

Accordingly, the present invention has been made to solve the above-mentioned problems occurring in the prior art, and an object of the present invention is to provide a bi-directional sliding-type portable terminal mounting a bidirectional sliding body on a phone body in order to use a camera lens in a more efficient manner.

It is another object of the present invention to provide a bidirectional sliding-type portable terminal allowing fabrication in a compact size.

In order to accomplish these objects, according to one aspect of the present invention, there is provided a bi-directional sliding-type portable terminal comprising a phone body having a first section which is located on one side of the top surface thereof and within which a plurality of keys are mounted, and a second section which is located on the other side of the top surface thereof spaced apart from the first section and within which a camera lens housing is mounted; and a bi-directional sliding body linearly moving on the phone body in a longitudinal direction while facing the phone body, opening the first section to expose the keys by moving toward the second section, and opening the second section to expose the camera lens housing by moving toward the first section.

In order to accomplish these objects, according to another aspect of the present invention, there is provided a bidirectional sliding-type portable terminal comprising a phone body having a first section which is located on one side of the top surface thereof and within which a plurality of first keys are mounted, and a second section which is located on the other side of the top surface thereof spaced apart from the first section and within which a camera lens housing is rotatably mounted about a hinge axis; a bi-directional sliding body linearly moving on the phone body in a longitudinal direction while facing the phone body, opening the first section to expose the first keys by moving toward the second section, opening the second section to expose the camera lens housing by moving toward the first section, and protecting the first keys and the camera lens housing from an external environment in a state of facing the first keys and the camera lens housing; and an opening formed on the second section in order to rotatably receive the camera lens housing.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described in detail with reference to the accompanying drawings. In the following description of the present invention, a detailed description of known functions and configurations incorporated herein is omitted to avoid making the subject matter of the present invention unclear.

As shown in FIGS. 1 to 7, a portable terminal according to a first preferred embodiment of the present invention comprises a phone body 10, and a bi-directional sliding body 20 linearly moving on the phone body 10 in a longitudinal direction relative to the phone body 10.

To be more specific, the portable terminal according to the present invention is designed so that a linear movement in either longitudinal direction is carried out while a top surface 10a of the phone body 10 faces a bottom surface 20b of the bi-directional sliding body 20, and thus either one side or the other side of the top surface of the phone body 10 is partially opened to a predetermined extent according to a direction in which the bi-directional sliding body 20 moves. Further, the movement range of the bi-directional sliding body 20 is limited by a stopper (not shown), and particularly to a distance large enough to open all of both sides of the top surface 10a of the phone body 10.

Figure 3:
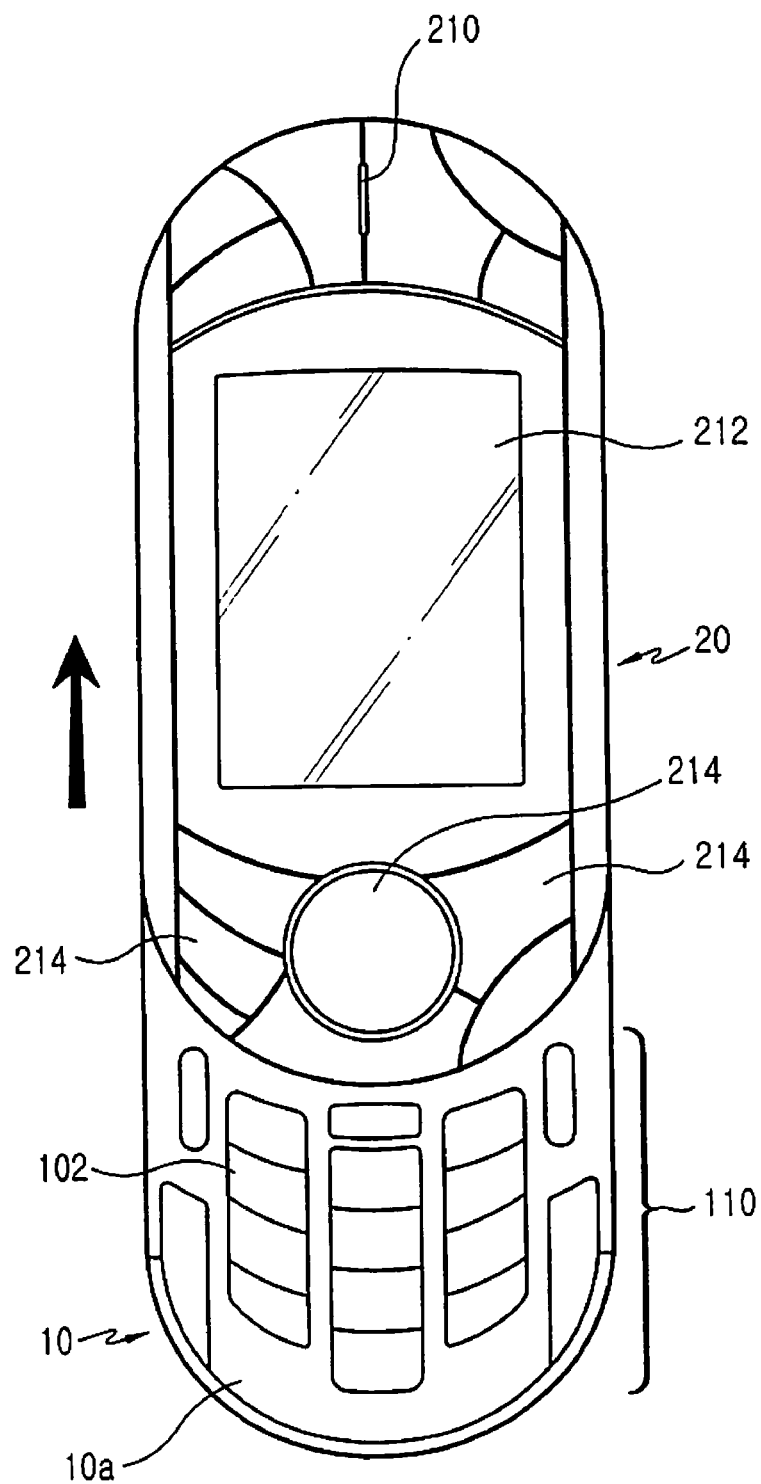
FIG. 3 is a top plan view showing a state in which the bi-directional sliding body of FIG. 1 is moved in one direction, so that keys are exposed.
Figure 4:
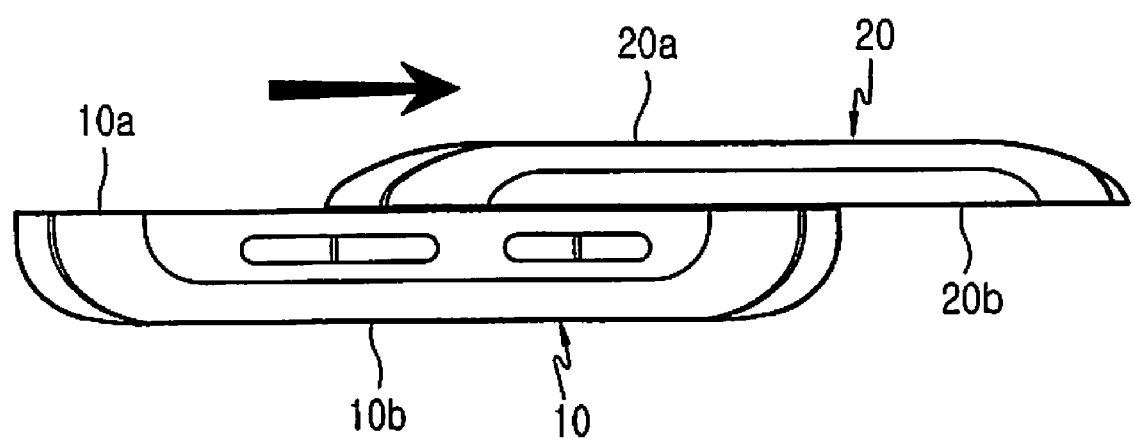
FIG. 4 is a side elevation view of FIG. 3.
Figure 5:
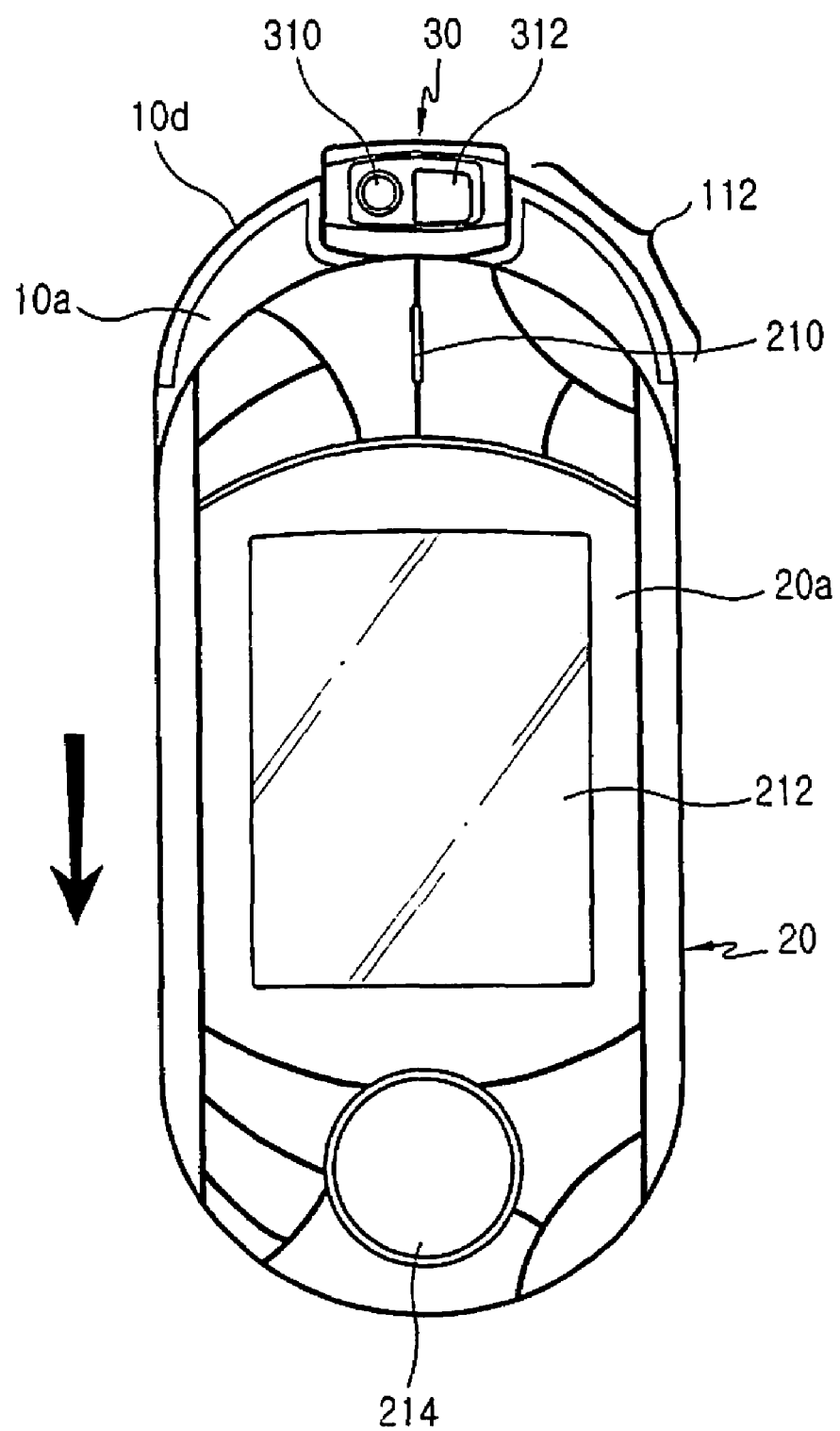
FIG. 5 is a top plan view showing a state in which the bi-directional sliding body of FIG. 1 is moved in the other direction, so that a camera lens housing is exposed.

The phone body 10 includes a first section 110 (FIG. 3) which is located on one side of the top surface 10a thereof and within which a plurality of first keys 102 are mounted, and a second section 112 (FIG. 5) which is located on the other side of the top surface 10a thereof spaced apart from the first section 110 and within which a camera lens housing 30 is mounted. FIG. 3 shows a state in which the first section 110 is opened, and FIG. 5 shows a state in which the first section 110 is closed.

Figure 1:
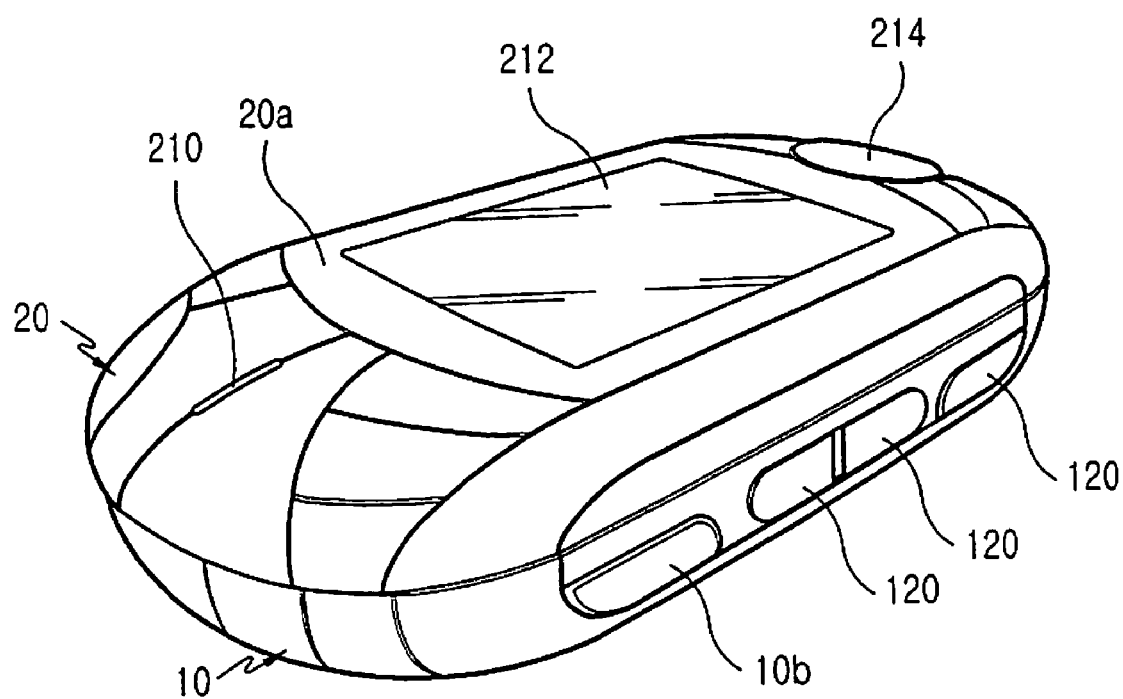
FIG. 1 is a perspective view of a bi-directional sliding-type portable terminal according to a first preferred embodiment of the present invention.
Figure 2:
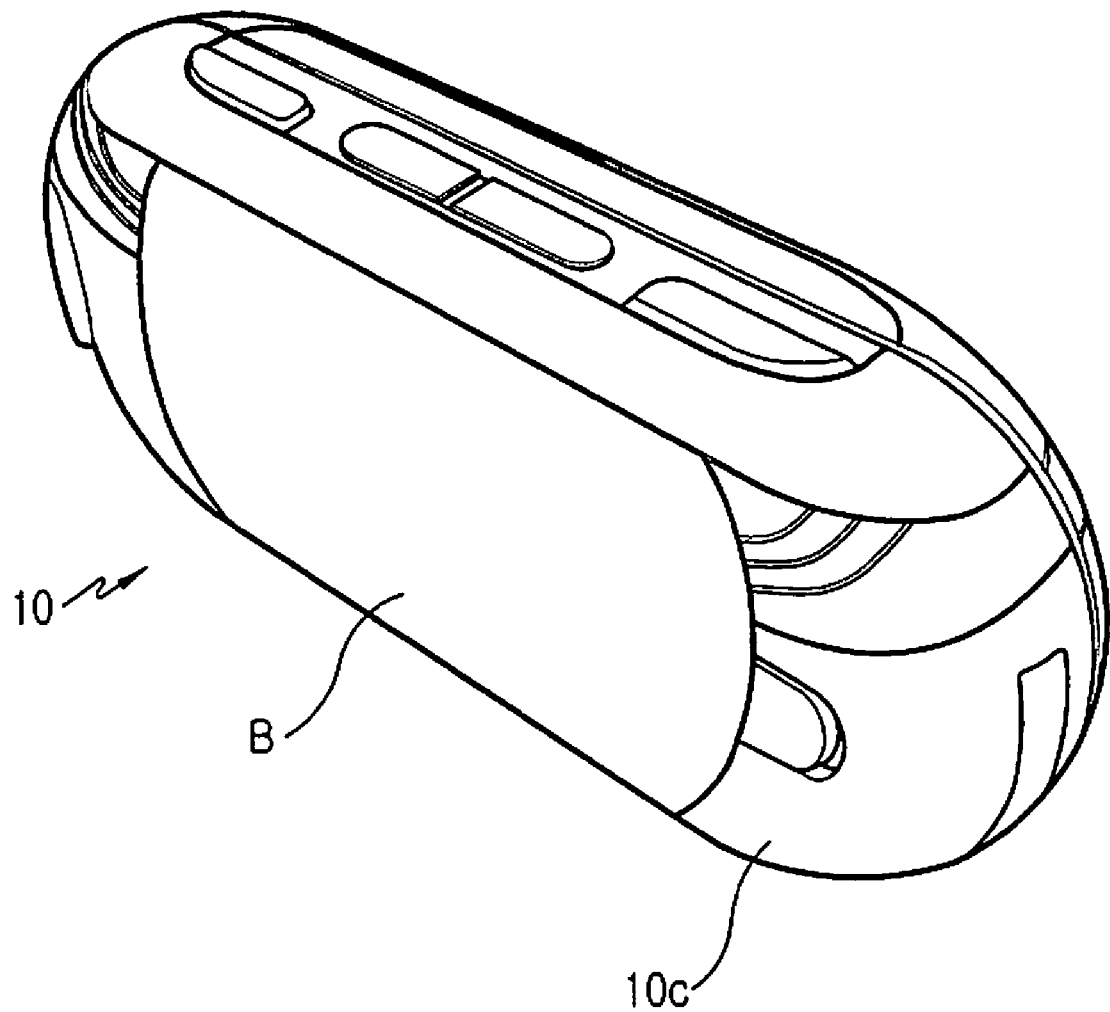
FIG. 2 is a perspective view showing a bottom surface of the portable terminal shown in FIG. 1.

The phone body 10 has lateral sides, one 10b of which is provided with a plurality of second keys 120, and a bottom surface 10c on which a battery pack B is mounted as shown in FIG. 2.

The bidirectional sliding body 20 includes a speaker 210, a display unit 212 and a plurality of third keys 214, all of which are provided on a top surface 20a thereof.

When moved toward the second section 112, the bi-directional sliding body 20 opens the first section 110 to expose the first keys 102. By contrast, when moved toward the first section 110, the bi-directional sliding body 20 opens the second section 112 to expose the camera lens housing 30. During a stand-by time, the first and second sections 110 and 112 of the phone body 10 are both covered by the bi-directional sliding body 20.

Figure 6:
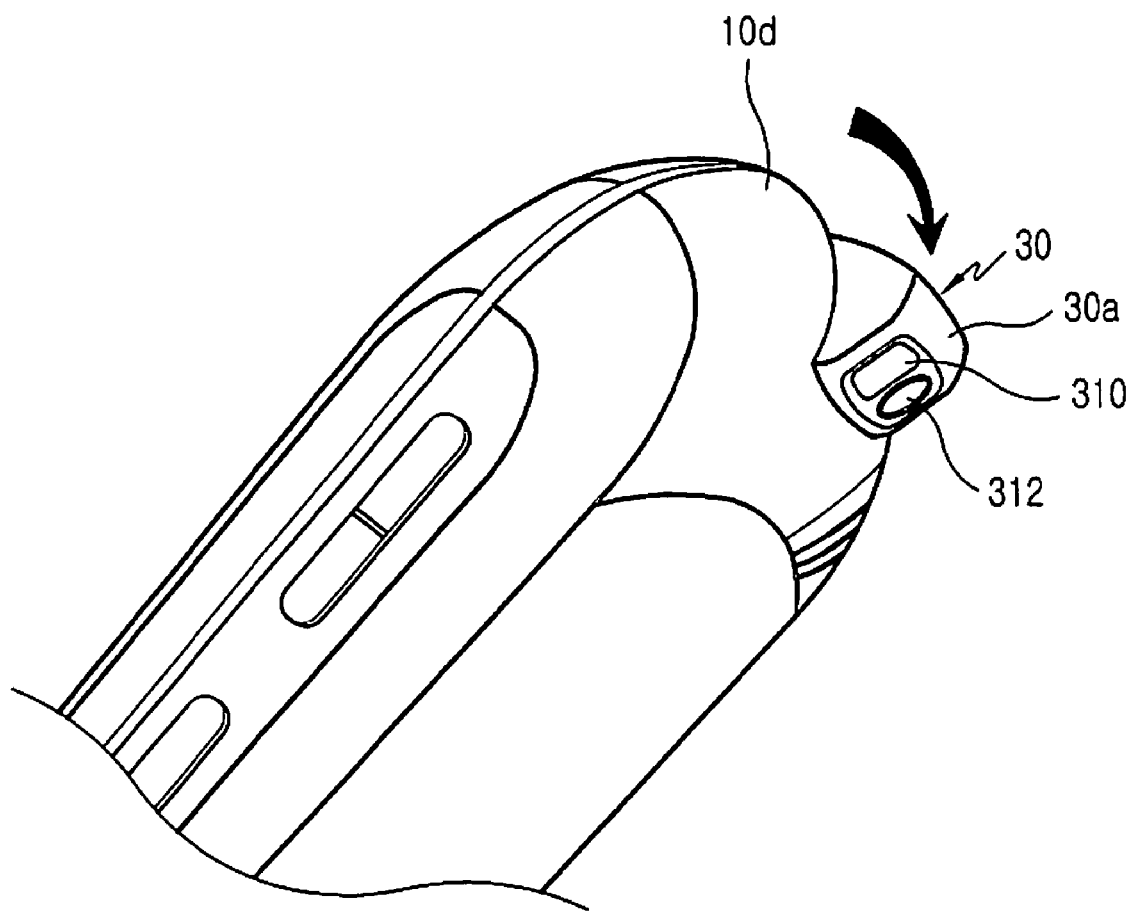
FIG. 6 is a perspective view showing a state in which the camera lens housing rotates.

As shown in FIGS. 5 and 6, the camera lens housing 30 comprises a lens 310 and a flash unit 312 adjacent to the lens 310, both of which are mounted on an outer surface in an exposed manner. Here, the camera lens housing 30 is rotatably mounted. To this end, a rotational axis of the camera lens housing 30 is perpendicular to the longitudinal direction in which the bidirectional sliding body 20 slides.

Figure 7:
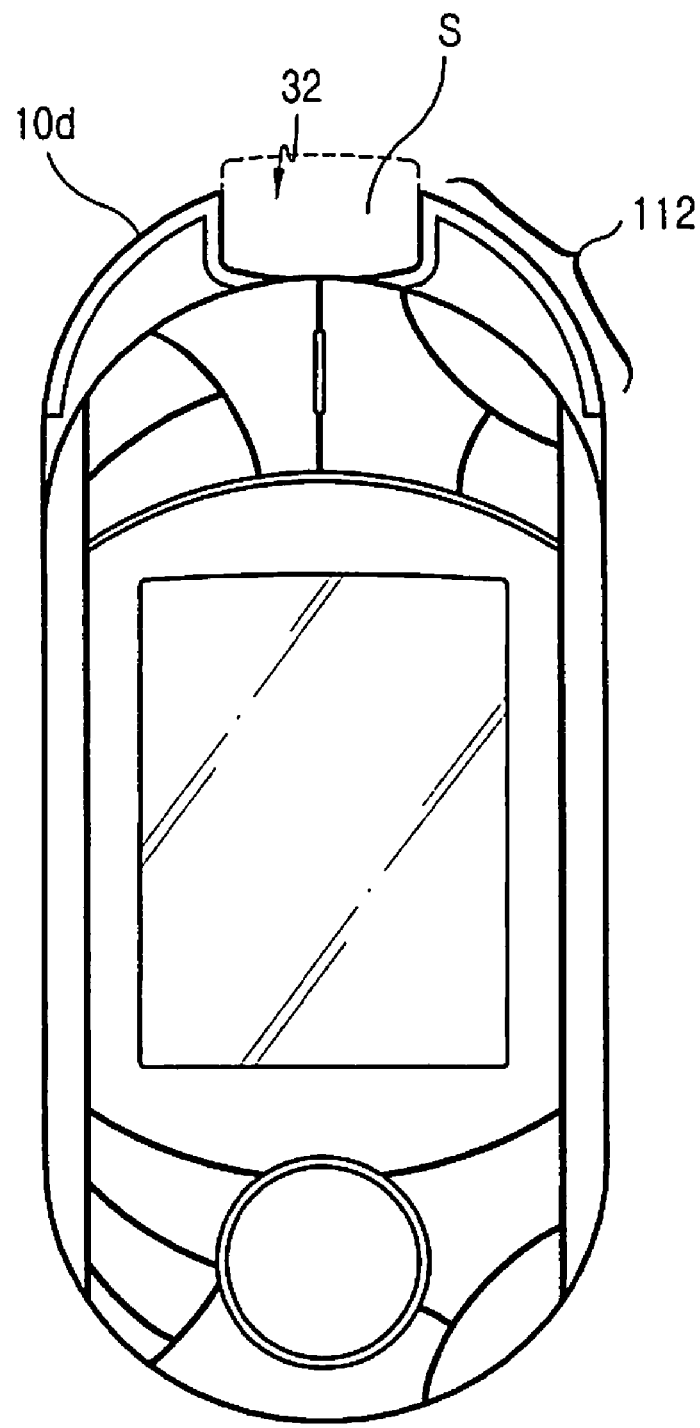
FIG. 7 is a top plan view showing a state in which the camera lens housing shown in FIG. 5 is removed.
Figure 8:
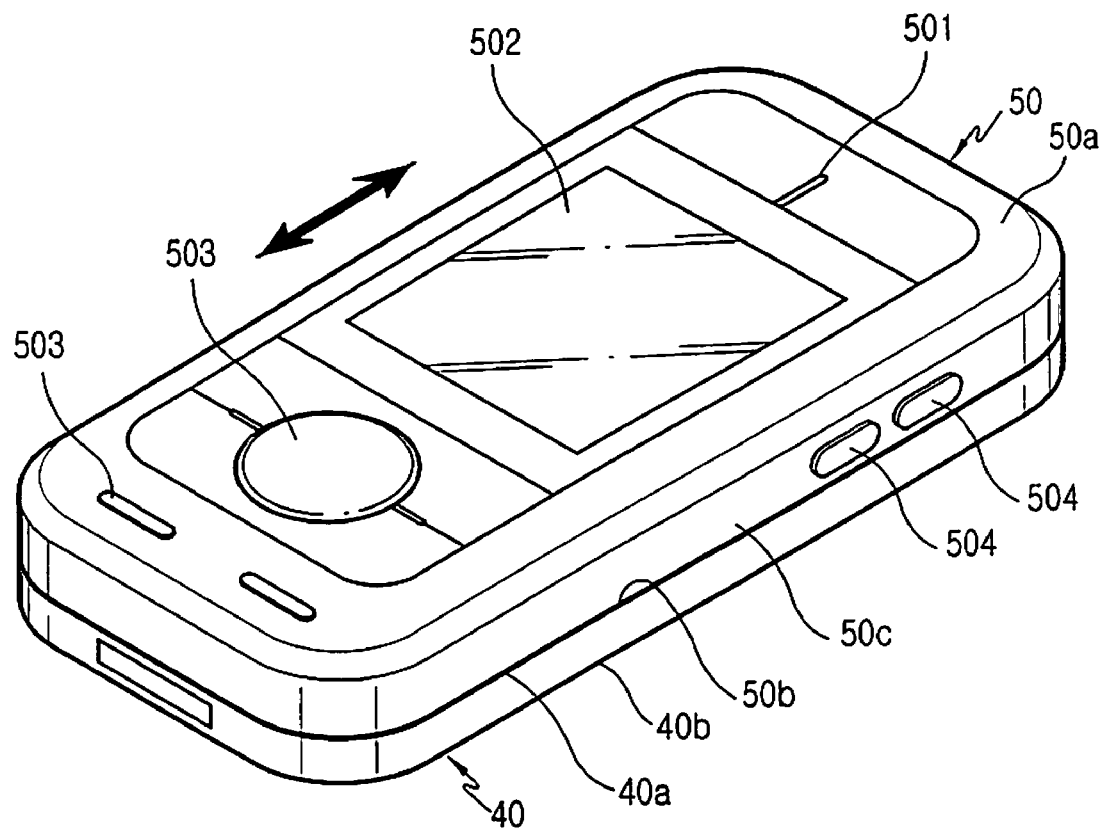
FIG. 8 is a perspective view of a bi-directional sliding-type portable terminal according to a second preferred embodiment of the present invention.

As shown in FIGS. 5 and 7, the second section 112 is formed with an opening 32, in which the camera lens housing 30 is rotatably received. The opening 32 takes a form of a slot S which passes through the second section 112. Therefore, a photograph can be taken of a subject through the lens 310, wherein the subject is oriented toward any one of the top, front or bottom surfaces 10d, 10a, or 10c of the phone body 10.

Additionally, when the bi-directional sliding body 20 slides to cover the first section 110, the portable terminal is automatically converted into a camera photographing mode. This is preferably realized using a separate proximity sensor, which is not shown in the drawings. Further, even when the bidirectional sliding body 20 is closed onto the phone body 10 (see FIG. 6), a desired subject can be photographed by rotating the camera lens housing 30.

As shown in FIGS. 8 to 12, a portable terminal according to a second preferred embodiment of the present invention comprises a phone body 40, and a bi-directional sliding body 50 linearly moving on the phone body 40 in either longitudinal direction while facing the phone body 40. The portable terminal according to the present invention is designed so that a linear movement is carried out while a top surface 40a of the phone body 40 faces a bottom surface 40b of the bidirectional sliding body 50, and thus either one side or the other of the top surface 40a of the phone body 40 is partially opened to a predetermined extent according to the longitudinal direction in which the bi-directional sliding body 50 moves.

Figure 12:
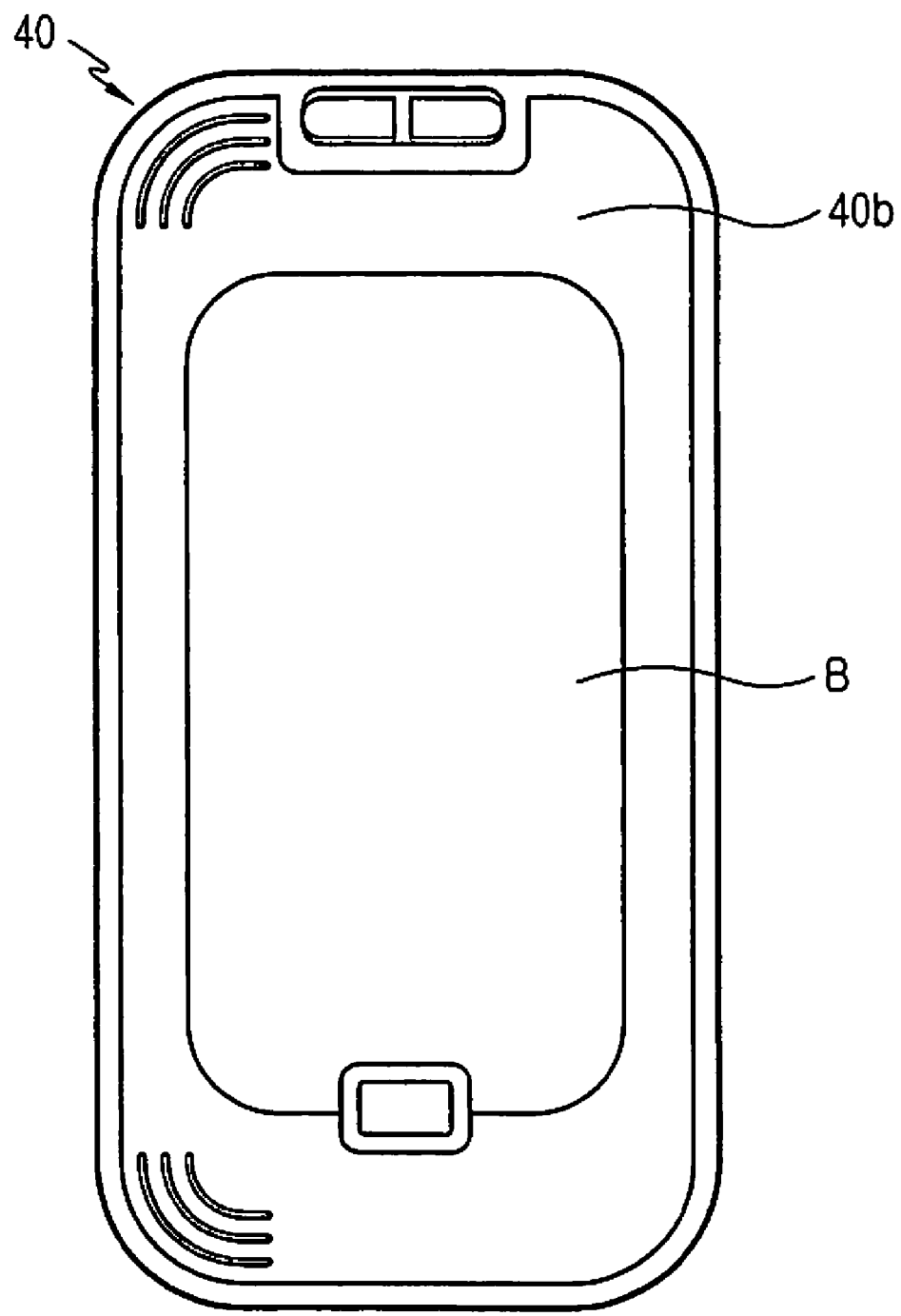
FIG. 12 is a plan view showing a bottom surface of the portable terminal shown in FIG. 8.

The phone body 40 includes a first section 410 which is located on one side of the top surface 40a thereof and within which a plurality of first keys 401 are mounted, and a second section 412 which is located on the other side of the top surface 40a thereof spaced apart from the first section 410 and within which a camera lens housing 60 is mounted. The bi-directional sliding body 50 has lateral sides, one 50b of which is provided with a plurality of second keys 504. The phone body 40 has a bottom surface 40b on which a battery pack B is mounted as shown in FIG. 12.

The bidirectional sliding body 50 includes a speaker 501, a display unit 502 and a plurality of third keys 503, all of which are provided on a top surface 50a thereof.

Figure 9:
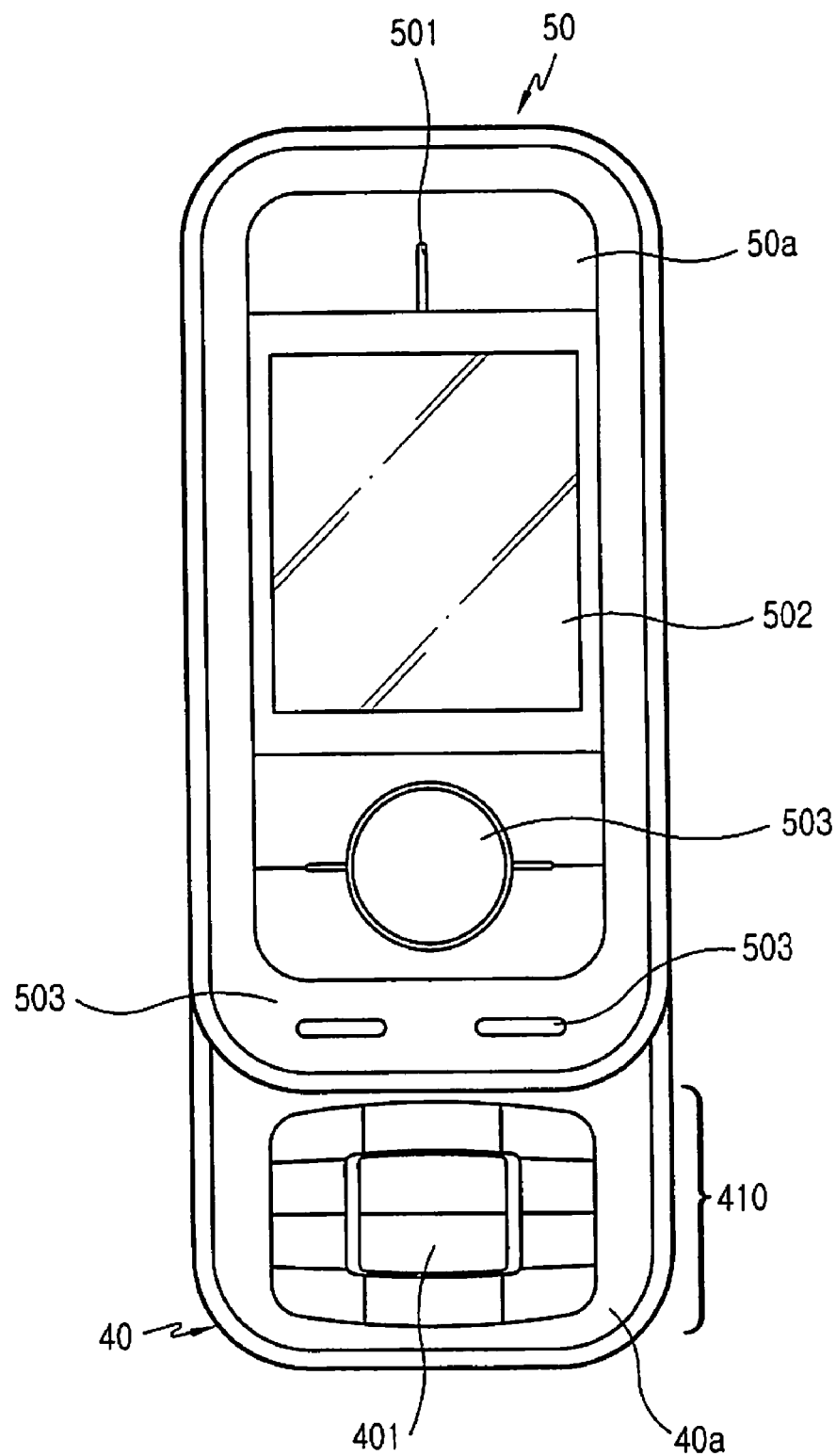
FIG. 9 is a top plan view showing a state in which the bi-directional sliding body of FIG. 8 is moved in one direction, so that keys are exposed.
Figure 10:
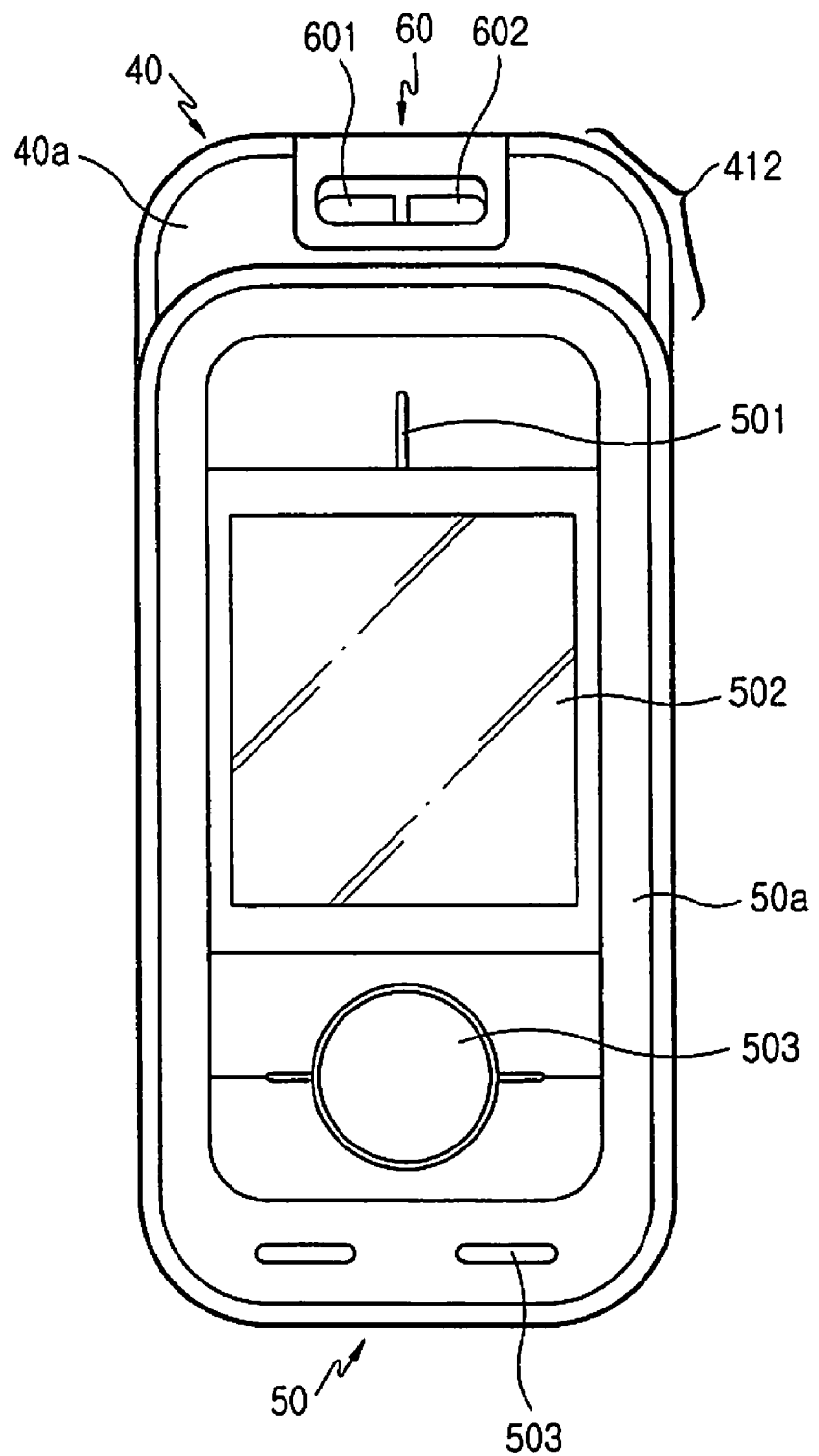
FIG. 10 is a top plan view showing a state in which the bi-directional sliding body of FIG. 8 is moved in the other direction, so that a camera lens housing is exposed.

When moved toward the second section 412, the bi-directional sliding body 50 opens the first section 410 to expose the first keys 401. By contrast, when moved toward the first section 410, the bidirectional sliding body 50 opens the second section 412 to expose the camera lens housing 60. These states are shown in FIGS. 9 and 10, respectively.

The camera lens housing 60 comprises a lens 601 and a flash unit 602 adjacent to the lens 601, both of which are mounted and exposed on an outer surface thereof. Here, the camera lens housing 60 is rotatably mounted. To this end, a rotational axis of the camera lens housing 60 is perpendicular to the longitudinal direction in which the bi-directional sliding body 50 slides.

Figure 11:
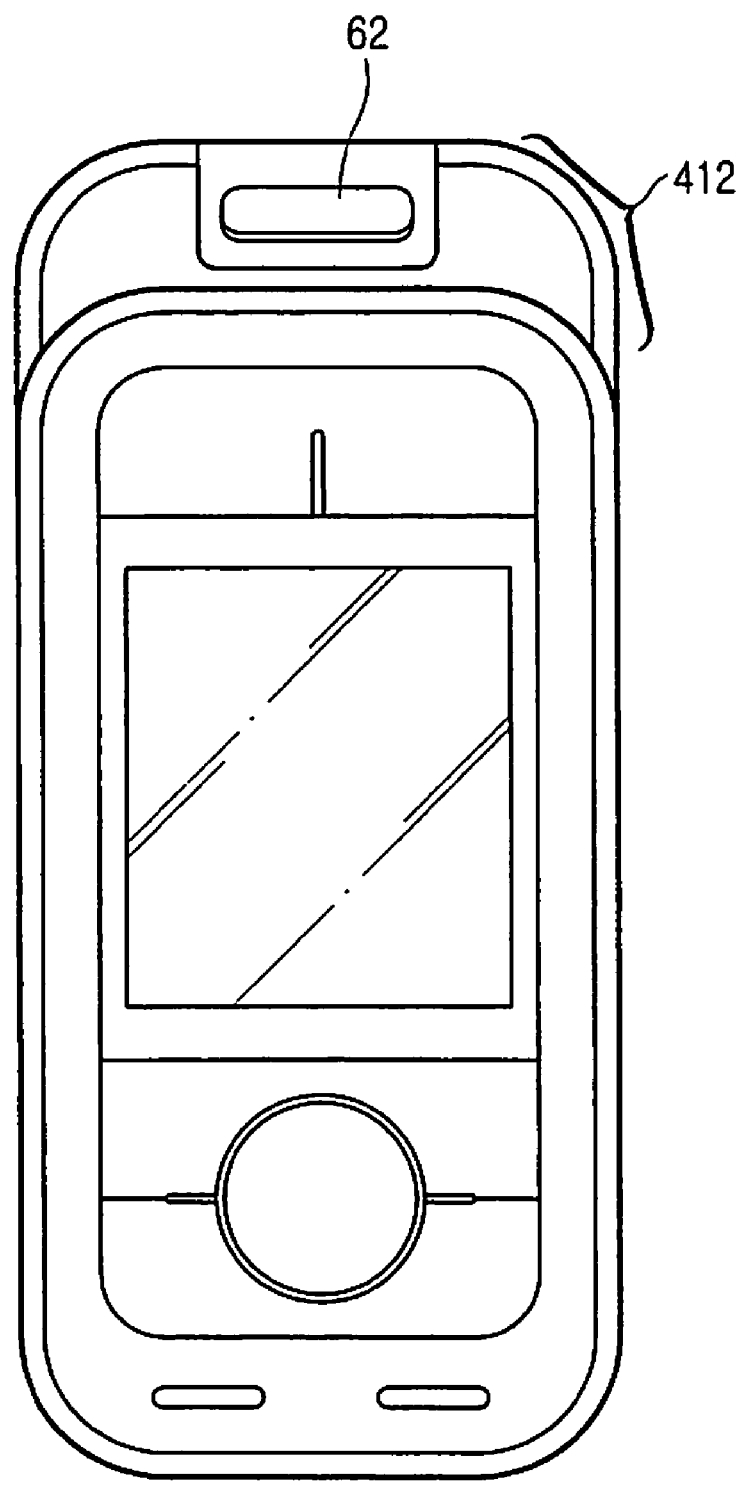
FIG. 11 is a top plan view showing a state in which the camera lens housing shown in FIG. 10 is removed.

FIG. 11 shows a state of removing a camera lens housing from a phone body. As shown in FIG. 11, the second section 412 is formed with an opening 62, in which the camera lens housing 60 is rotatably received. The opening 62 is formed as a receiving hole. Therefore, the camera lens housing 60 is designed to rotate about a hinge axis in the receiving hole. A photograph can be taken of a desired subject through the lens 601 which is oriented toward any one of the top and bottom surfaces 40a and 40b of the phone body 40.

Additionally, when the bi-directional sliding body 50 is moved toward the first section 410, the portable terminal is automatically converted into a camera photographing mode. This is preferably realized using a separate proximity sensor, which is not shown in the drawings. Further, even when the bi-directional sliding body 50 is closed onto the phone body 40, a desired subject can be photographed by rotating the camera lens housing 60.

Further, the bi-directional sliding body functions to protect the keys disposed on the first section 410 of the phone body 40 as well as the camera lens housing 60 disposed on the second section 412 from conditions of an external environment.

As can seen from the foregoing, the present invention employs a construction in that the bi-directional sliding body is mounted on the phone body, so that it is possible to efficiently use the lens of the camera lens housing and to protect the lens from the external environment. In addition, the present invention is designed to allow the bi-directional sliding body to selectively move in either longitudinal direction by push action from a user's finger, so that manipulation of the keys or photographing by the lens can be selected.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A bi-directional sliding-type portable terminal comprising:
   a phone body having a first section which is located on one side of a top surface thereof and within which a plurality of keys are included, and a second section which is located on an other side of the top surface thereof spaced apart from the first section; and
   a bi-directional sliding body linearly movable on the phone body in a longitudinal direction, wherein the first section is opened by moving toward the second section and the second section is opened by moving toward the first section,
   wherein the bi-directional sliding body covers both the first section and the second section when in a predetermined position.

2. The bi-directional sliding-type portable terminal as claimed in claim 1, wherein within the second section, a camera lens housing is mounted.

3. The bi-directional sliding-type portable terminal as claimed in claim 2, wherein the camera lens housing is rotatably mounted.

4. The bi-directional sliding-type portable terminal as claimed in claim 3, further comprising a hinge axis of the camera lens housing being perpendicular to the longitudinal direction in which the bi-directional sliding body moves.

5. The bi-directional sliding-type portable terminal as claimed in claim 1, wherein the bi-directional sliding body comprises a speaker, a display unit adjacent to the speaker and a plurality of second keys adjacent to the display unit, each provided on a top surface thereof.

6. The bi-directional sliding-type portable terminal as claimed in claim 1, wherein the bi-directional sliding body substantially covers both the first section and the second section when in a predetermined position.

7. The bi-directional sliding-type portable terminal as claimed in claim 1, wherein the bi-direction sliding body comprises a display.

8. The bi-directional sliding-type portable terminal as claimed in claim 1, wherein within the second section, an electronic component is included.

* * * * *